J. W. Newton.
Clod Cutter.
Nº 88,801.  Patented Apr. 13, 1869.
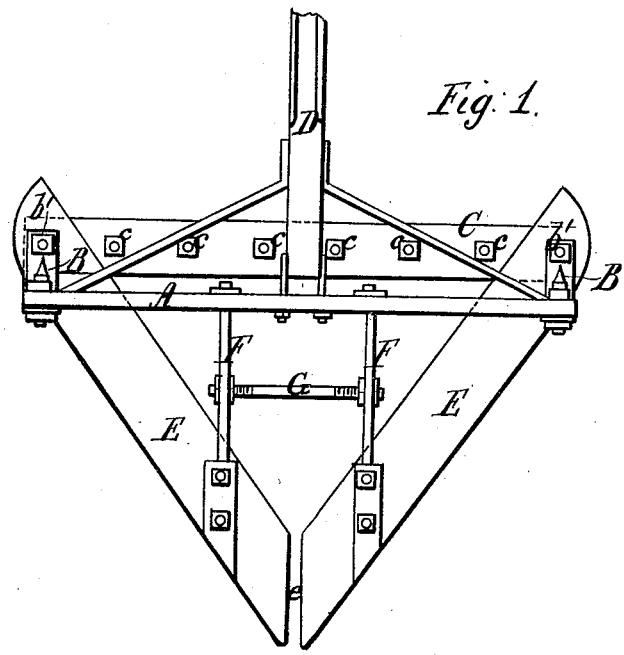
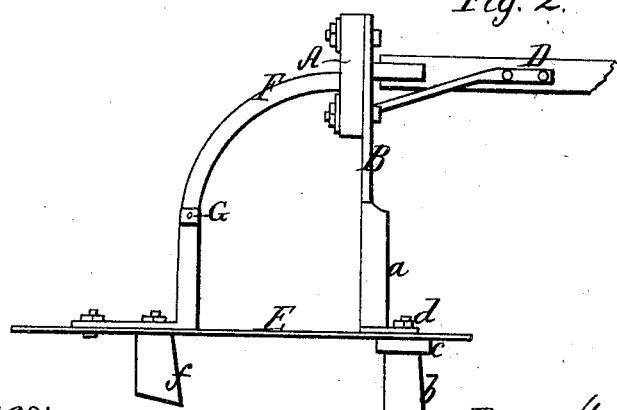
Witnesses:  Inventor:
Phil. F. Larner,  John W. Newton
Geo. S. Rothwell  By Diedeschaw & Co.
  Attys

JOHN W. NEWTON, OF GENEVA, WISCONSIN.

Letters Patent No. 88,801, dated April 13, 1869.

IMPROVEMENT IN BOG-CUTTER AND DRAG.

The Schedule referred to in these Letters Patent and making part of the same.

*To all whom it may concern:*

Be it known that I, JOHN W. NEWTON, of Geneva, in the county of Walworth, and State of Wisconsin, have invented a new and useful Improved Combined Bog-Cutter and Drag; and I do hereby declare that the following is a full, clear, and exact description of the same, sufficient to enable others skilled in the art to which my invention appertains, to make and use the same, reference being had to the accompanying drawings, forming part of this specification, in which—

Figure 1 is a top view of my improved cutter and drag, and

Figure 2 is a side elevation.

Similar letters of reference indicate corresponding parts in the several figures.

My invention is designed as an improvement on the combined bog-cutter and drag for which Letters Patent were granted to me, on the 3d day of November, 1868, and it consists—

First, in providing the L-shaped hangers, depending from the stock, with sharpened edges.

Second, in attaching cutters to the plate, secured to the L-shaped hangers, said cutters extending in the rear of the plate, in the shape of the letter V, and connected with the stock by means of braces, all as hereinafter more fully described.

In the drawings—

A is a stock, to which are attached L-shaped hangers, B B.

The front edges of these hangers B B are bevelled, as shown at $a$, fig. 2.

To the lower ends of the hangers, a plate, C, provided with drag-teeth, $b$ $b$, is attached by means of the teeth $b'$ $b'$, which pass through the hangers as well as the plate.

These teeth are fitted through holes formed in the plate, and there secured by nuts, $c$, screwed on to their upper ends.

A draught-tongue, D, is secured to the stock A, in any suitable manner.

Cutters, E E, are attached to the plate C by means of the teeth $b'$, which pass through said plate and the hangers B B, and are there secured by nuts, $d$.

These cutters extend back in the rear of the plate C, until they form the shape of the letter V, as shown in fig. 1.

A space, $e$, is left between the two cutters, to allow the grass to pass through, thereby preventing the clogging of the machine.

The cutters E E are supported by means of braces, F F, attached both to the stock A and the rear ends of the cutters.

These supporters are connected by a screw-rod, G, and have their front edges bevelled, as also the cutters E E.

In order to steady the machine, and prevent lateral motion, I attach, to the rear ends of the cutters E E, two drag-teeth, $f f$.

The operation is as follows:

The plate C is detached by removing the teeth $b'$, when the ground is to be levelled, and also, the rear teeth $f$. When operating in hard ground this should be done. A portion or all of the teeth may be allowed to remain when operating in soft ground. The cutter is steadied in its operations by the sinking of the teeth into the ground.

After the field has been traversed with the cutter, and the knolls, or hummocks removed, the detached sods are thrown out of the way by the drag.

The teeth are all used while dragging, and the cutters may or may not be detached, as desired. The teeth penetrate the earth only to a slight extent while dragging. It is only necessary to use the drag when the field has an even surface.

In order to prevent the accumulation of the soil, an open space is left between the plate C and stock A, the soil passing over the former as the machine advances, and being delivered in the rear. If this were not done it would be necessary to stop the machine every few minutes, and remove the obstructions.

Constructed as above described, a simple, durable, and effective implement is effected for preparing the ground for plowing.

Having thus described my invention,

What I claim as new, and desire to secure by Letters Patent, is—

1. The L-shaped hangers, B B, provided with sharpened edges, substantially as and for the purpose herein described.

2. The cutters E E, converging from the rear of the plate C, in V-shape substantially as and for the purpose set forth.

3. The steadying-teeth $f f$, in combination with the V-shaped cutters E E, as and for the purpose herein described.

4. The braces F F, provided with sharpened edges, and connecting the V-shaped cutters E E with the stock A, substantially, and for the purpose herein described.

5. The combination of the toothed plate C, cutters E E, hangers B B, braces F F, and stock A, with a tongue D, all constructed and arranged substantially as herein shown and described.

To the above specification I have signed my name, this 5th day of February, 1869.

JOHN W. NEWTON.

Witnesses:
ROBERT HARKNESS,
GEO. P. LEE.